(12) United States Patent
Sakamoto et al.

(10) Patent No.: US 11,028,767 B2
(45) Date of Patent: Jun. 8, 2021

(54) VARIABLE GEOMETRY TURBOCHARGER

(71) Applicant: MITSUBISHI HEAVY INDUSTRIES ENGINE & TURBOCHARGER, LTD., Sagamihara (JP)

(72) Inventors: Keigo Sakamoto, Tokyo (JP); Yosuke Dammoto, Tokyo (JP); Eigo Katou, Tokyo (JP); Yoji Akiyama, Tokyo (JP); Nariaki Seike, Tokyo (JP); Toyotaka Yoshida, Tokyo (JP); Takeru Chiba, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 239 days.

(21) Appl. No.: 16/087,907

(22) PCT Filed: Mar. 28, 2016

(86) PCT No.: PCT/JP2016/059938
§ 371 (c)(1),
(2) Date: Sep. 24, 2018

(87) PCT Pub. No.: WO2017/168523
PCT Pub. Date: Oct. 5, 2017

(65) Prior Publication Data
US 2020/0232383 A1     Jul. 23, 2020

(51) Int. Cl.
*F01D 17/16*     (2006.01)
*F02B 37/24*     (2006.01)
(Continued)

(52) U.S. Cl.
CPC .............. *F02B 37/24* (2013.01); *F02B 39/00* (2013.01); *F04D 27/002* (2013.01);
(Continued)

(58) Field of Classification Search
CPC .... F01D 17/165; F01D 25/145; F01D 25/243; F02B 37/24; F02B 37/22; F02B 37/186
See application file for complete search history.

(56) References Cited

U.S. PATENT DOCUMENTS

| | | | | |
|---|---|---|---|---|
| 4,907,952 A | * | 3/1990 | Inoue ................... | F01D 17/165 417/407 |
| 6,543,994 B2 | * | 4/2003 | Jinnai ................... | F01D 17/165 415/160 |

(Continued)

FOREIGN PATENT DOCUMENTS

| | | |
|---|---|---|
| EP | 0 270 384 A2 | 6/1988 |
| EP | 1 816 317 A2 | 8/2007 |

(Continued)

OTHER PUBLICATIONS

Office Action dated Apr. 13, 2020 issued in counterpart Chinese Application No. 201680084053.3.
(Continued)

*Primary Examiner* — Brian P Wolcott
*Assistant Examiner* — Behnoush Haghighian
(74) *Attorney, Agent, or Firm* — Birch, Stewart, Kolasch & Birch, LLP

(57) ABSTRACT

A variable geometry turbocharger (100) includes a bearing housing (10) including a bearing-housing side support portion (40) configured to support a radially outer portion (38) of a nozzle mount (16) from a side opposite to a scroll flow passage (4) in an axial direction of a turbine rotor (2), and wherein at least one of the following condition (a) or (b) is satisfied: (a) the bearing-housing side support portion (40) includes at least one bearing-housing side recess portion (46) formed so as to be recessed in the axial direction so as not to be in contact with the radially outer portion (38); (b) the radially outer portion (38) of the nozzle mount (16) includes at least one nozzle-mount side recess portion (62)
(Continued)

formed so as to be recessed in the axial direction so as not to be in contact with the bearing-housing side support portion (40).

11 Claims, 13 Drawing Sheets

(51) Int. Cl.
  *F02B 39/00* (2006.01)
  *F04D 27/00* (2006.01)
  *F01D 25/24* (2006.01)
  *F02B 37/18* (2006.01)
  *F02B 37/22* (2006.01)
  *F01D 25/14* (2006.01)

(52) U.S. Cl.
  CPC .......... *F01D 17/165* (2013.01); *F01D 25/145* (2013.01); *F01D 25/243* (2013.01); *F02B 37/186* (2013.01); *F02B 37/22* (2013.01)

(56) References Cited

U.S. PATENT DOCUMENTS

| 8,764,389 | B2* | 7/2014 | Boening | F02C 6/12 |
| | | | | 415/164 |
| 9,784,119 | B2* | 10/2017 | Tashiro | F01D 17/165 |
| 9,810,238 | B2* | 11/2017 | Annati | F01D 9/045 |
| 2001/0017032 | A1* | 8/2001 | Jinnai | F02C 6/12 |
| | | | | 60/605.2 |
| 2013/0259661 | A1* | 10/2013 | Shudo | F16J 15/0887 |
| | | | | 415/170.1 |
| 2014/0037436 | A1* | 2/2014 | Tabata | F01D 25/24 |
| | | | | 415/178 |
| 2014/0161595 | A1* | 6/2014 | Tashiro | F04D 27/002 |
| | | | | 415/146 |
| 2014/0178181 | A1* | 6/2014 | Tashiro | F02B 37/04 |
| | | | | 415/148 |

FOREIGN PATENT DOCUMENTS

| JP | 61-192523 U | 11/1986 |
| JP | 63-150424 A | 6/1988 |
| JP | 1-80633 U | 5/1989 |
| JP | 2012-62808 A | 3/2012 |
| JP | 2013-72403 A | 4/2013 |
| JP | 2013-72404 A | 4/2013 |

OTHER PUBLICATIONS

Extended European Search Report dated Jan. 18, 2019 issued in the corresponding European Application No. 16896743.8.
International Preliminary Report on Patentability dated Oct. 11, 2018 in corresponding International (PCT) Application No. PCT/JP2016/059938 with an English Translation.
International Search Report of PCT/JP2016/059938 dated May 31, 2016.
Office Action effective Jun. 25, 2019 issued in the corresponding Japanese Application No. 2018-507846 with Machine Translation.
Office Action dated Oct. 1, 2019 issued in the corresponding European Patent Application No. 16896743.8.
Extended European Search Report dated Dec. 5, 2019 issued in the corresponding European Application No. 19187361.1

\* cited by examiner

VARIABLE GEOMETRY TURBOCHARGER

TECHNICAL FIELD

The present disclosure relates to a variable geometry turbocharger.

BACKGROUND ART

A variable geometry turbocharger adjusts the flow of exhaust gas to a turbine rotor from a scroll flow passage inside a turbine housing to change the flow velocity and the pressure of exhaust gas to turbine blades, so as to enhance the supercharging effect.

As shown in FIG. 13, a variable nozzle mechanism 012 normally includes a nozzle vane 014 disposed in an exhaust gas flow passage 026 for guiding exhaust gas from a scroll flow passage 004 to a turbine rotor 002, a nozzle mount 016 having an annular shape and forming a flow passage wall 028 on the side of a bearing housing 010, of the exhaust gas flow passage, the nozzle mount 016 supporting the nozzle vane rotatably, and a nozzle plate 018 disposed so as to face the nozzle mount, the nozzle plate 018 having an annular shape and forming a flow passage wall 032 opposite to the bearing housing, of the exhaust gas flow passage.

In the variable geometry turbocharger disclosed in Patent Document 1, the bearing housing includes a bearing-housing side support portion which supports the radially outer portion of the nozzle mount from the opposite side to the scroll flow passage in the axial direction of the turbine rotor, and the turbine housing includes a turbine-housing side support portion which supports the radially outer portion of the nozzle mount from the opposite side to the bearing-housing side support portion in the axial direction. The nozzle mount is nipped by the turbine-housing side support portion and the bearing-housing side support portion.

CITATION LIST

Patent Literature

Patent Document 1: JP2013-72403A

SUMMARY

Problems to be Solved

According to findings of the present inventors, in a case where the bearing housing includes the bearing-housing side support portion supporting the radially outer portion of the nozzle mount like the variable geometry turbocharger disclosed in Patent Document 1, as indicated by the arrow H in FIG. 13, the radially outer portion 038 of the nozzle mount 016 heated by the exhaust gas flow from the scroll flow passage 004 releases heat toward the bearing-housing side support portion 040, and heat loss occurs. The bearing housing is cooled by lubricant oil supplied to the bearing and has a lower temperature than the nozzle mount. Thus, a great heat loss tends to occur due to the above heat release.

When heat loss occurs, the turbine thermal efficiency decreases, and the performance of the variable geometry turbocharger also decreases.

Further, when heat loss occurs, the exhaust gas temperature of the turbine outlet decreases. Thus, in a case where a catalyst for purifying exhaust gas is disposed on the downstream side of the turbine, the temperature of the catalyst decreases and the performance of the catalyst deteriorates, causing contamination of exhaust gas with impurity substances (e.g. NOx and SOx).

The present invention was made in view of the above described typical problem, and an object is to provide a variable geometry turbocharger capable of reducing heat loss due to heat release from the radially outer portion of the nozzle mount to the bearing-housing side support portion.

Solution to the Problems (1) According to at least one embodiment of the present invention, a variable geometry turbocharger includes: a turbine rotor; a turbine housing which accommodates the turbine rotor and which forms a scroll flow passage on a radially outer side of the turbine rotor; a bearing housing accommodating a bearing which rotatably supports the turbine rotor, the bearing housing being coupled to the turbine housing; and a variable nozzle mechanism for adjusting a flow of exhaust gas to the turbine rotor from the scroll flow passage. The variable nozzle mechanism includes: a nozzle vane disposed in an exhaust gas flow passage for guiding the exhaust gas from the scroll flow passage to the turbine rotor; a nozzle mount having an annular shape and supporting the nozzle vane rotatably, the nozzle mount forming a flow passage wall on a bearing-housing side of the exhaust gas flow passage; and a nozzle plate having an annular shape and being disposed so as to face the nozzle mount, the nozzle plate forming a flow passage wall on a side opposite to the bearing housing, of the exhaust gas flow passage. The bearing housing includes a bearing-housing side support portion configured to support a radially outer portion of the nozzle mount from a side opposite to the scroll flow passage in an axial direction of the turbine rotor. At least one of the following condition (a) or (b) is satisfied: (a) the bearing-housing side support portion includes at least one bearing-housing side recess portion formed so as to be recessed toward a side opposite to the nozzle mount in the axial direction; (b) the radially outer portion of the nozzle mount includes at least one nozzle-mount side recess portion formed so as to be recessed to a side opposite to the bearing housing in the axial direction.

According to the above variable geometry turbocharger (1), if the condition (a) is satisfied, with the bearing-housing side recess portion, it is possible to reduce the contact area between the bearing-housing side support portion and the radially outer portion of the nozzle mount, and to reduce heat release amount from the radially outer portion of the nozzle mount to the bearing housing, through the heat insulating effect of the air layer between the bearing-housing side recess portion and the radially outer portion of the nozzle mount. Accordingly, it is possible to reduce heat loss due to heat release from the radially outer portion of the nozzle mount to the bearing housing, and improve the turbine efficiency and the performance of the turbocharger.

Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

Furthermore, if the condition (b) is satisfied, with the nozzle-mount side recess portion, it is possible to reduce the contact area between the bearing-housing side support portion and the radially outer portion of the nozzle mount, and to reduce the heat release amount from the radially outer portion of the nozzle mount to the bearing housing, through the heat insulating effect of the air layer inside the nozzle-mount side recess portion. Accordingly, it is possible to reduce heat loss due to heat release from the radially outer portion of the nozzle mount to the bearing housing, and improve the turbine efficiency and the performance of the turbocharger.

Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

(2) In some embodiments, in the above variable geometry turbocharger (1), the at least one bearing-housing side recess portion or the at least one nozzle-mount side recess portion includes a plurality of bearing-housing side recess portions disposed at intervals in a circumferential direction of the turbine rotor or a plurality of nozzle-mount side recess portions disposed at intervals in the circumferential direction.

According to the above variable geometry turbocharger (2), with the plurality of bearing-housing side recess portions or the plurality of nozzle-mount side recess portions provided at intervals in the circumferential direction, it is possible to reduce the contact area between the bearing-housing side support portion and the radially outer portion of the nozzle mount effectively, and reduce the heat release amount from the radially outer portion of the nozzle mount to the bearing housing effectively, through the heat insulating effect of the air layer inside the nozzle-mount side recess portions.

(3) In some embodiments, the above variable geometry turbocharger (1) or (2) further includes a plurality of bolts disposed at intervals in a circumferential direction of the turbine rotor and configured to fasten the turbine housing and the bearing housing in the axial direction. The bearing-housing side recess portion or the nozzle-mount side recess portion is formed in an angular range which does not overlap with a center position of a bolt adjacent to the bearing-housing side recess portion or the nozzle-mount side recess portion, of the plurality of bolts, in the circumferential direction.

According to the above variable geometry turbocharger (3), for the bearing-housing side recess portion or the nozzle-mount side recess portion is formed in an angular range that does not overlap with the center position of an adjacent bolt in the circumferential direction, it is possible to reduce heat loss due to heat release from the radially outer portion of the nozzle mount to the bearing housing while ensuring a fastening force between the bearing housing and the turbine housing achieved by the bolt.

(4) In some embodiments, in the above variable geometry turbocharger (3), the bearing-housing side recess portion or the nozzle-mount side recess portion is formed to be 5 degrees or more apart from the center position of the bolt adjacent to the bearing-housing side recess portion or the nozzle-mount side recess portion, of the plurality of bolts, in the circumferential direction.

According to the above variable geometry turbocharger (4), for the bearing-housing side recess portion or the nozzle-mount side recess portion is formed to be 5 degrees or more apart from the center position of the bolt, it is possible to reduce heat loss due to heat release from the radially outer portion of the nozzle mount to the bearing housing while ensuring a fastening force between the bearing housing and the turbine housing achieved by the bolts.

(5) In some embodiments, in the variable geometry turbocharger according to any one of the above (1) to (4), the turbine housing includes a turbine-housing side support portion configured to support the radially outer portion of the nozzle mount from a side opposite to the bearing-housing side support portion in the axial direction. The nozzle mount is nipped by the turbine-housing side support portion and the bearing-housing side support portion. The turbine-housing side support portion is disposed so as to protrude toward an inner side of the bearing-housing side support portion in a radial direction of the turbine rotor, along a surface of the nozzle mount.

Typically, to nip the nozzle mount with a simple structure, the radially inner end of the turbine-housing side support portion is positioned on the same position as the radially inner end of the bearing-housing side support portion with respect to the radial direction.

In contrast, according to the above variable geometry turbocharger (5), the turbine-housing side support portion is disposed so as to protrude toward the inner side, with respect to the radial direction, of the bearing-housing side support portion along the surface of the nozzle mount, and accordingly, the area of the nozzle mount covered with the turbine-housing side support portion is larger than that in a typical structure (normal design range). Thus, it is possible to reduce the area of a portion of the nozzle mount exposed to a high-temperature exhaust gas flow from the scroll flow passage to the exhaust gas flow passage (heat transfer area). Accordingly, the heat absorption amount of the nozzle mount reduces, and thus an increase in the metal temperature of the nozzle mount is suppressed. Accordingly, the temperature difference between the nozzle mount and the bearing housing becomes small, and thus it is possible to reduce heat loss due to heat release from the radially outer portion of the nozzle mount to the bearing housing, and improve the turbine efficiency and the performance of the turbocharger.

(6) According to at least one embodiment of the present invention, a variable geometry turbocharger includes: a turbine rotor; a turbine housing which accommodates the turbine rotor and which forms at least a part of a scroll flow passage through which exhaust gas to be supplied to the turbine rotor flows; a bearing housing accommodating a bearing which rotatably supports the turbine rotor, the bearing housing being coupled to the turbine housing; and a variable nozzle mechanism for adjusting a flow of exhaust gas to the turbine rotor from the scroll flow passage formed on a radially outer side of the turbine rotor. The variable nozzle mechanism includes: a nozzle vane disposed in an exhaust gas flow passage for guiding the exhaust gas from the scroll flow passage to the turbine rotor; a nozzle mount having an annular shape and supporting the nozzle vane rotatably, the nozzle mount forming a flow passage wall on a bearing-housing side of the exhaust gas flow passage; and a nozzle plate having an annular shape and being disposed so as to face the nozzle mount, the nozzle plate forming a flow passage wall on a side opposite to the bearing housing, of the exhaust gas flow passage. The bearing housing includes a bearing-housing side support portion configured to support a radially outer portion of the nozzle mount from a side opposite to the scroll flow passage in an axial direction of the turbine rotor. The turbine housing includes a turbine-housing side support portion configured to support the radially outer portion of the nozzle mount from a side opposite to the bearing-housing side support portion in the axial direction. The nozzle mount is nipped by the turbine-housing side support portion and the bearing-housing side support portion. The turbine-housing side support portion is disposed so as to protrude toward an inner side of the bearing-housing side support portion in a radial direction of the turbine rotor, along a surface of the nozzle mount.

Typically, to nip the nozzle mount with a simple structure, the radially inner end of the turbine-housing side support portion is positioned on the same position as the radially inner end of the bearing-housing side support portion with respect to the radial direction.

In contrast, according to the above variable geometry turbocharger (6), the turbine-housing side support portion is disposed so as to protrude toward the inner side, with respect to the radial direction, of the bearing-housing side support portion along the surface of the nozzle mount, and accordingly, the area of the nozzle mount covered with the turbine-housing side support portion is larger than that in a typical structure (normal design range). Thus, it is possible to reduce the area of a portion of the nozzle mount exposed to a high-temperature exhaust gas flow from the scroll flow passage to the exhaust gas flow passage (heat transfer area). Accordingly, the heat absorption amount of the nozzle mount reduces, and thus an increase in the metal temperature of the nozzle mount is suppressed. Accordingly, the temperature difference between the nozzle mount and the bearing housing becomes small, and thus it is possible to reduce heat loss due to heat release from the radially outer portion of the nozzle mount to the bearing housing, and improve the turbine efficiency and the performance of the turbocharger.

Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

(7) In some embodiments, in the above variable geometry turbocharger (5) or (6), the turbine-housing side support portion includes a contact portion to be in contact with the radially outer portion of the nozzle mount, and a non-contact portion formed on an inner side of the contact portion in the radial direction, the non-contact portion facing the nozzle mount via a gap.

With the above configuration (7), the turbine-housing side support portion has the non-contact portion on the inner side of the contact portion with respect to the radial direction, and thus it is possible to cover the radially outer portion of the nozzle mount with the turbine-housing side support portion while suppressing an increase in the contact area between the bearing-housing side support portion and the radially outer portion of the nozzle mount. Accordingly, it is possible to reduce the area of a portion of the nozzle mount exposed to a high-temperature exhaust gas flow from the scroll flow passage to the exhaust gas flow passage (heat transfer area), and suppress an increase in the heat input amount to the radially outer portion of the nozzle mount from the turbine-housing side support portion. Accordingly, it is possible to suppress an increase in the metal temperature of the nozzle mount effectively, and reduce heat loss due to heat release from the radially outer portion of the nozzle mount to the bearing housing effectively.

(8) In some embodiments, in the variable geometry turbocharger according to any one of the above (5) to (7), an expression $0 \leq (r1-r3)/(r2-r3) \leq 0.75$ is satisfied, where r1 is a distance between a radially inner end of the turbine-housing side support portion and a rotational axis of the turbine rotor, r2 is a distance between a radially outer end of the nozzle mount and the rotational axis, and r3 is a distance between a radially outer end of the nozzle plate and the rotational axis.

According to the above variable geometry turbocharger (8), it is possible to suppress an increase in the metal temperature of the nozzle mount effectively while suppressing interference by the turbine-housing side support portion to a smooth flow in the exhaust gas flow passage between the nozzle mount and the nozzle plate, and reduce heat loss due to heat release from the radially outer portion of the nozzle mount to the bearing housing effectively.

(9) In some embodiments, in the above variable geometry turbocharger (8), an expression $0 \leq (r1-r3)/(r2-r3) \leq 0.30$ is satisfied.

According to the above variable geometry turbocharger (9), it is possible to suppress an increase in the metal temperature of the nozzle mount effectively while suppressing interference by the turbine-bearing side support portion to a smooth flow in the exhaust gas flow passage between the nozzle mount and the nozzle plate, and reduce heat loss due to heat release from the radially outer portion of the nozzle mount to the bearing housing effectively.

Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

(10) In some embodiments, the variable geometry turbocharger according to any one of the above (1) to (9) further includes a heat shield member disposed between the bearing-housing side support portion and the nozzle mount.

According to the above variable geometry turbocharger (10), through the heat shield effect of the heat shield member, it is possible to reduce the heat release amount from the radially outer portion of the nozzle mount to the bearing housing. Accordingly, it is possible to reduce heat loss due to heat release from the radially outer portion of the nozzle mount to the bearing housing, and improve the turbine efficiency and the performance of the turbocharger.

(11) According to at least one embodiment of the present invention, a variable geometry turbocharger includes: a turbine rotor; a turbine housing which accommodates the turbine rotor and which forms at least a part of a scroll flow passage through which exhaust gas to be supplied to the turbine rotor flows; a bearing housing accommodating a bearing which rotatably supports the turbine rotor, the bearing housing being coupled to the turbine housing; and a variable nozzle mechanism for adjusting a flow of exhaust gas to the turbine rotor from the scroll flow passage formed on a radially outer side of the turbine rotor. The variable nozzle mechanism includes: a nozzle vane disposed in an exhaust gas flow passage for guiding the exhaust gas from the scroll flow passage to the turbine rotor; a nozzle mount having an annular shape and supporting the nozzle vane rotatably, the nozzle mount forming a flow passage wall on a bearing-housing side of the exhaust gas flow passage; and a nozzle plate having an annular shape and being disposed so as to face the nozzle mount, the nozzle plate forming a flow passage wall on a side opposite to the bearing housing, of the exhaust gas flow passage. The bearing housing includes a bearing-housing side support portion configured to support a radially outer portion of the nozzle mount from a side opposite to the scroll flow passage in an axial direction of the turbine rotor. A heat shield member is disposed between the bearing-housing side support portion and the nozzle mount.

According to the above variable geometry turbocharger (11), through the heat shield effect of the heat shield member, it is possible to reduce the heat release amount from the radially outer portion of the nozzle mount to the bearing housing. Accordingly, it is possible to reduce heat loss due to heat release from the radially outer portion of the nozzle mount to the bearing housing, and improve the turbine efficiency and the performance of the turbocharger.

Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

(12) In some embodiments, in the above variable geometry turbocharger (10) or (11), the heat shield member has a lower thermal conductivity than each of a thermal conductivity of the bearing housing and a thermal conductivity of the nozzle mount.

According to the above variable geometry turbocharger (12), it is possible to reduce the heat release amount from the radially outer portion of the nozzle mount to the bearing housing effectively.

(13) In some embodiments, in the variable geometry turbocharger according to any one of the above (10) to (12), the heat shield member is formed of austenitic stainless steel or nickel-based alloy.

According to the above variable geometry turbocharger (13), it is possible to reduce the heat release amount from the radially outer portion of the nozzle mount to the bearing housing effectively, while ensuring the heat resistance performance of the heat shield member itself.

(14) In some embodiments, in the variable geometry turbocharger according to any one of the above (10) to (13), the heat shield member includes a ring-shaped heat-shield plate disposed so that the bearing-housing side support portion and the nozzle mount do not make contact with each other over an entire angular range in a circumferential direction of the turbine rotor.

According to the above variable geometry turbocharger (14), it is possible to reduce the heat release amount from the radially outer portion of the nozzle mount to the bearing housing with a simple configuration.

(15) In some embodiments, in the variable geometry turbocharger according to any one of the above (10) to (13), the heat shield member includes a coating applied to the radially outer portion of the bearing-housing side support portion or the nozzle mount.

According to the above variable geometry turbocharger (15), it is possible to reduce the heat release amount from the radially outer portion of the nozzle mount to the bearing housing with a simple configuration.

Advantageous Effects

According to at least one embodiment of the present invention, provided is a variable geometry turbocharger whereby it is possible to reduce heat loss due to heat release from the radially outer portion of the nozzle mount to the bearing-housing side support portion.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
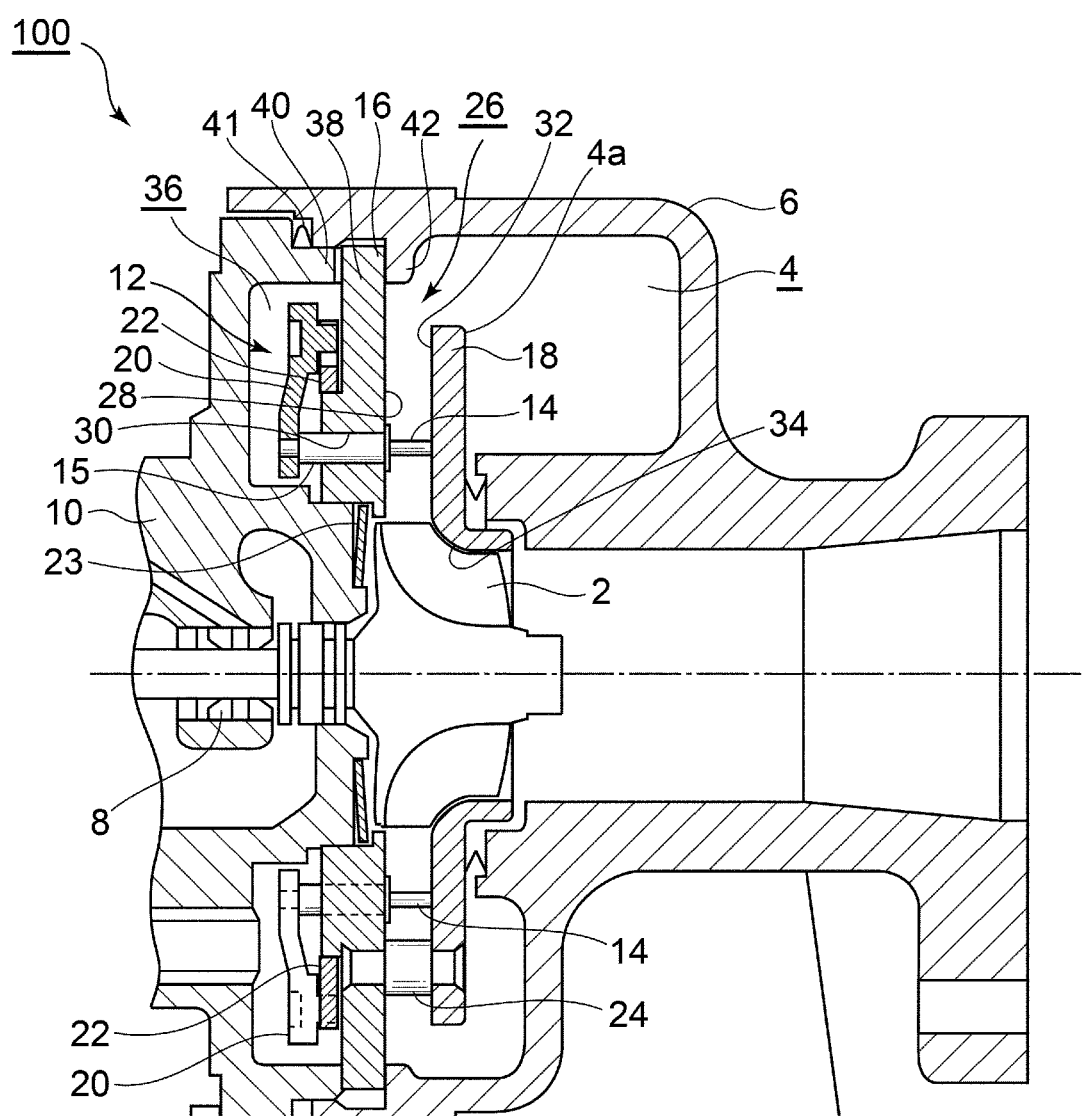
FIG. 1 is a schematic cross-sectional view of a variable geometry turbocharger 100 according to an embodiment of the present invention, taken along the rotational axis O of the turbocharger 100.

FIG. 1 is a schematic cross-sectional view of a variable geometry turbocharger 100 according to an embodiment of the present invention, taken along the rotational axis O of the turbocharger 100.

The variable geometry turbocharger 100 includes a turbine rotor 2 disposed coaxially with a non-depicted compressor, a turbine housing 6 that houses the turbine rotor 2 and forms a scroll flow passage 4 on the radially outer side of the turbine rotor 2, a bearing housing 10 housing a bearing 8 supporting the turbine rotor 2 rotatably and being coupled to the turbine housing 6, and a variable nozzle mechanism 12 disposed between the turbine housing 6 and the bearing housing 10, for adjusting the flow of exhaust gas from the scroll flow passage 4 to the turbine rotor 2.

Hereinafter, unless otherwise stated, the axial direction of the turbine rotor 2 is referred to as merely "axial direction", and the radial direction of the turbine rotor 2 is referred to as merely "radial direction", and the circumferential direction of the turbine rotor 2 is referred to as merely "circumferential direction".

The variable nozzle mechanism 12 includes a plurality of nozzle vanes 14, a nozzle mount 16, a nozzle plate 18, a plurality of lever plates 20, a drive ring 22, and a plurality of nozzle supports 24.

The plurality of nozzle vanes 14 are disposed at intervals in the circumferential direction, in an exhaust gas flow passage 26 having an annular shape for introducing exhaust gas from the scroll flow passage 4 to the turbine rotor 2.

The nozzle mount 16 is an annular plate disposed on the radially outer side of the turbine rotor 2, and forms a flow passage wall 28 on the side of the bearing housing 10, of the exhaust gas flow passage 26. The nozzle mount 16 is provided with a plurality of support holes 30 (through holes) for rotatably supporting the respective shaft portions 15 of the plurality of nozzle vanes 14.

The nozzle plate 18 is an annular plate disposed on the radially outer side of the turbine rotor 2 so as to face the nozzle mount 16, and forms a flow passage wall 32 on the opposite side to the bearing housing 10, of the exhaust gas flow passage 26. Further, the nozzle plate 18 forms, on the downstream side of the flow passage wall 32, a shroud wall 34 facing the tip-side ends of the blades of the turbine rotor 2 via a gap. The nozzle mount 16 and the nozzle plate 18 are coupled by a plurality of nozzle supports 24.

A back plate 23 is disposed between the back face of the turbine rotor 2 and the bearing housing 10, so that exhaust gas flowing from the exhaust gas flow passage 26 to the turbine rotor 2 does not leak toward the back side of the nozzle mount 16 (opposite to the exhaust gas flow passage 26) through the radially inner side of the nozzle mount 16. The back plate 23 is in contact with the nozzle mount 16 at one end side in the axial direction, and is in contact with the bearing housing 10 at the other end side in the axial direction.

In the variable nozzle mechanism 12 described above, the drive ring 22 is rotary driven by a driving force transmitted from a non-depicted actuator. When the drive ring 22 rotates, the lever plates 20 being in engagement with the drive ring 22 rotate the shaft portions 15 of the nozzle vanes 14, and as a result, the nozzle vanes 14 rotate to change the vane angle of the nozzle vanes 14, thereby adjusting the flow of exhaust gas from the scroll flow passage 4 to the turbine rotor 2.

In the depicted embodiment, an annular space 36 housing the lever plate 20 and the drive ring 22 is formed between the bearing housing 10 and the nozzle mount 16.

The bearing housing 10 includes a bearing-housing side support portion 40 having an annular shape and supporting the radially outer portion 38 of the nozzle mount 16 from the opposite side to the scroll flow passage 4 in the axial direction of the turbine rotor 2. The bearing-housing side support portion 40 is formed on the radially outer side of the annular space 36. On the radially outer side of the bearing-housing side support portion 40, a seal ring 41 is disposed between the turbine housing 6 and the bearing housing, and the seal ring 41 prevents leakage of exhaust gas from between the bearing housing 10 and the turbine housing 6.

The turbine housing 6 includes a turbine-housing side support portion 42 having an annular shape and supporting the radially outer portion 38 of the nozzle mount 16 from the opposite side to the bearing-housing side support portion 40 in the axial direction.

The nozzle mount 16 is held between the bearing-housing side support portion 40 and the turbine-housing side support portion 42. In the depicted embodiment, the turbine housing 6 and the bearing housing 10 are fastened in the axial direction by a plurality of bolts 44 disposed at intervals in the circumferential direction, and the nozzle mount 16 is held between the bearing-housing side support portion 40 and the turbine-housing side support portion 42 by the axial force of the bolts 44.

Figure 2:
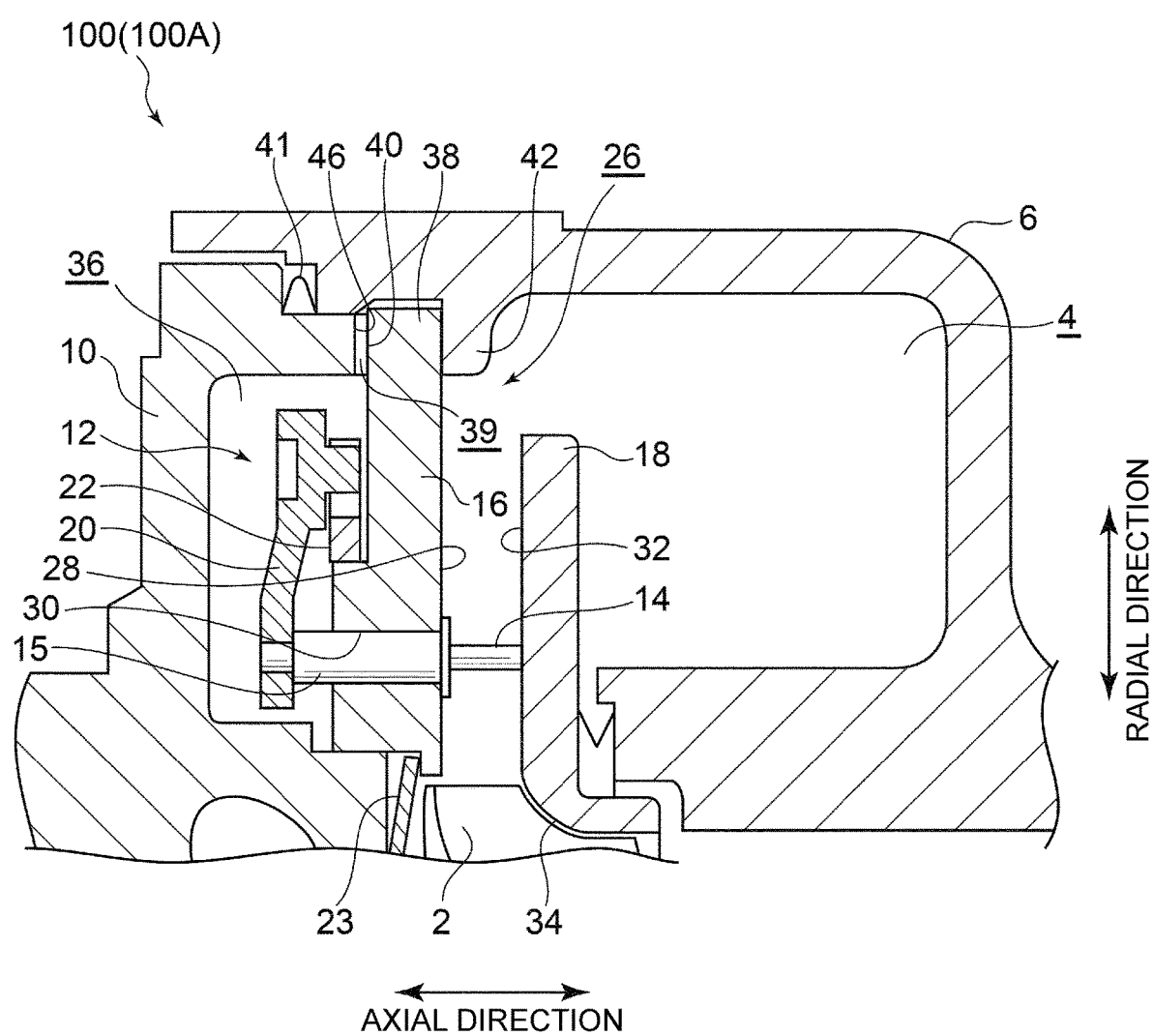
FIG. 2 is a schematic enlarged cross-sectional view of a variable geometry turbocharger 100 (100A) according to an embodiment.
Figure 3:
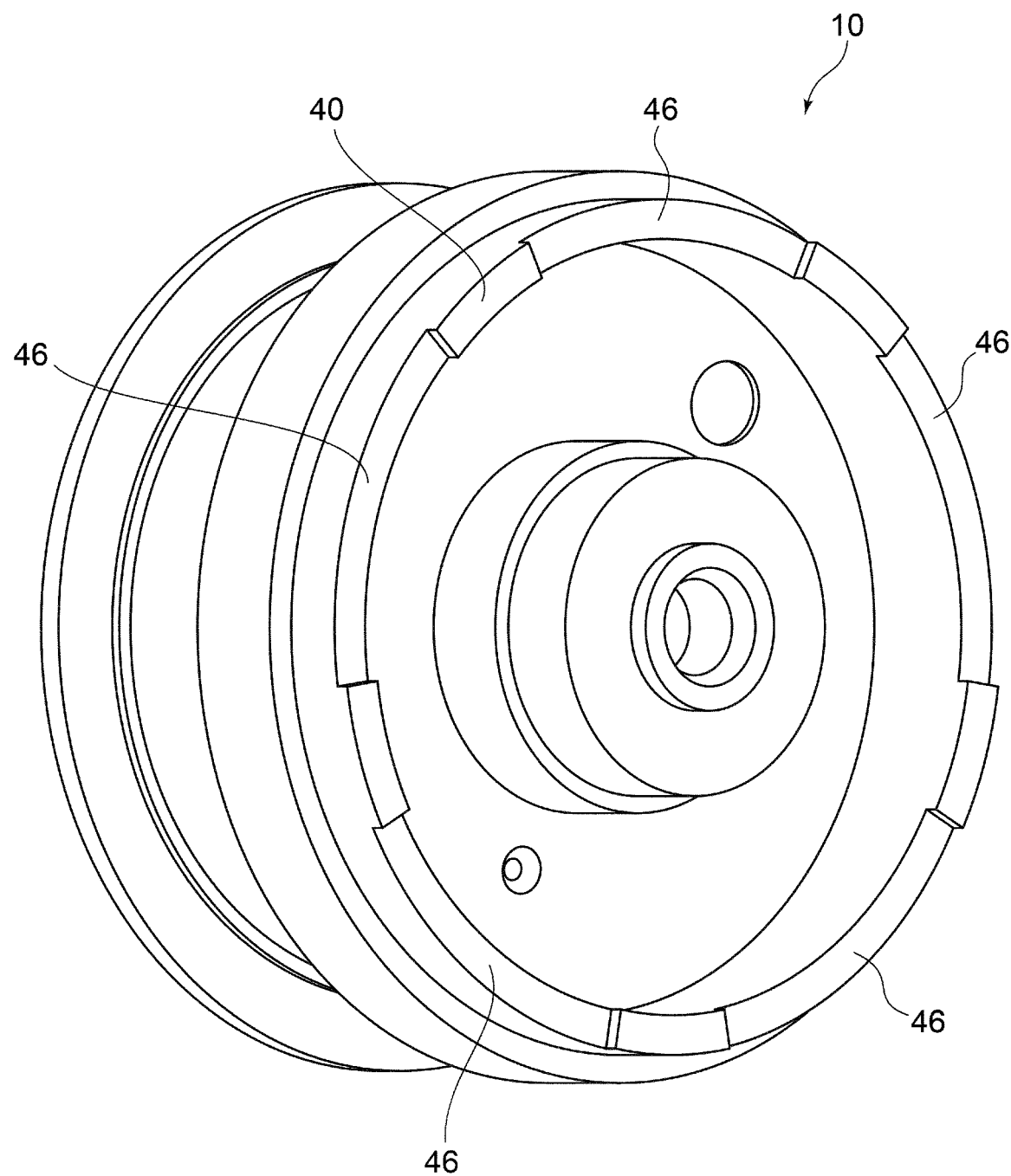
FIG. 3 is a perspective view of a bearing housing 10 of the variable geometry turbocharger 100 (100A) depicted in FIG. 2.

FIG. 2 is a schematic enlarged cross-sectional view of a configuration example 100 (100A) of a variable geometry turbocharger 100 (100A). FIG. 3 is a perspective view of a bearing housing 10 of the variable geometry turbocharger 100 (100A) depicted in FIG. 2.

In an embodiment, as shown in FIGS. 2 and 3, the bearing-housing side support portion 40 includes at least one bearing-housing side recess portion 46 formed so as to be recessed opposite to the nozzle mount 16 in the axial direction. In the depicted embodiment, the bearing-housing side support portion 40 includes a plurality of bearing-housing side recess portions 46 disposed at intervals in the circumferential direction.

According to the above configuration, with the bearing-housing side recess portions 46, it is possible to reduce the contact area between the bearing-housing side support portion 40 and the radially outer portion 38 of the nozzle mount 16, and to reduce the heat release amount from the radially outer portion 38 of the nozzle mount 16 to the bearing housing 10, through the heat insulating effect of an air layer 39 between the bearing-housing side recess portion 46 and the radially outer portion 38 of the nozzle mount 16. Accordingly, it is possible to reduce heat loss due to heat release from the radially outer portion 38 of the nozzle mount 16 to the bearing housing 10, and improve the turbine efficiency and the performance of the turbocharger 100.

Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

Figure 4:
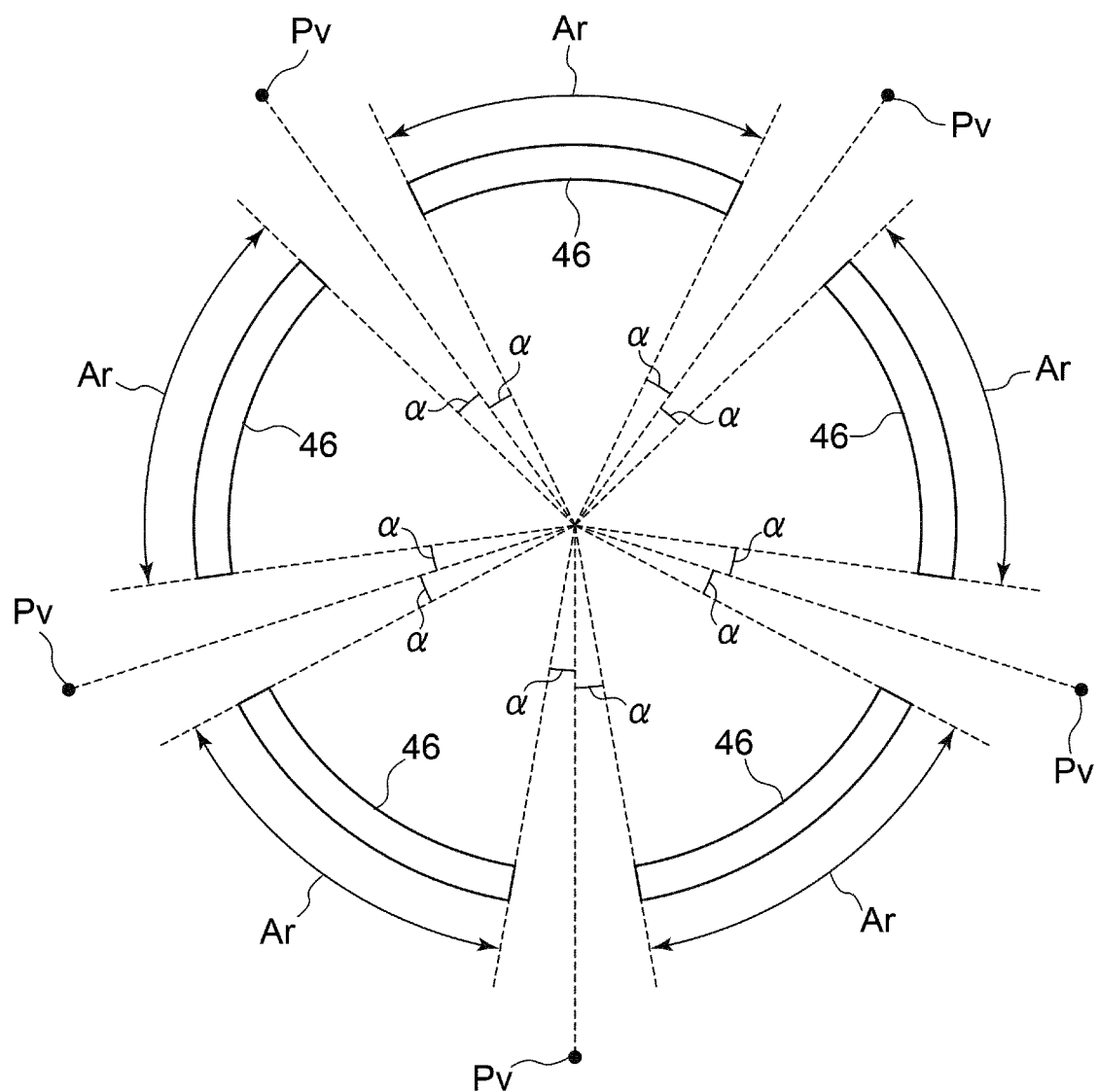
FIG. 4 is a schematic diagram showing positions of a bearing-housing side recess portion 46 and a bolt 44 with respect to the circumferential direction.

FIG. 4 is a schematic diagram showing positions of a bearing-housing side recess portion 46 and a bolt 44 with respect to the circumferential direction.

In an embodiment, as shown in FIG. 4, with respect to the circumferential direction, each of the bearing-housing side recess portions 46 is formed in an angular range Ar that does not overlap with the center position Pv of a bolt 44 adjacent to the bearing-housing side recess portion 46, of the plurality of bolts 44.

Accordingly, for the center position Pv and the angular range Ar do not overlap with each other, it is possible to reduce heat loss due to heat release from the radially outer portion 38 of the nozzle mount 16 to the bearing housing 10 while ensuring a fastening force between the bearing housing 10 and the turbine housing 6 achieved by the bolts 44.

In an embodiment, as shown in FIG. 4, each of the bearing-housing side recess portions 46 is five degrees or more apart from the center position of the bolt 44 adjacent to the bearing-housing side recess portion 46, of the plurality of bolts 44. That is, the angle α shown in FIG. 4 is not smaller than five degrees.

Accordingly, it is possible to reduce heat loss due to heat release from the radially outer portion 38 of the nozzle mount 16 to the bearing housing 10 while ensuring a strong fastening force between the bearing housing 10 and the turbine housing 6 achieved by the bolts 44.

Figure 5:
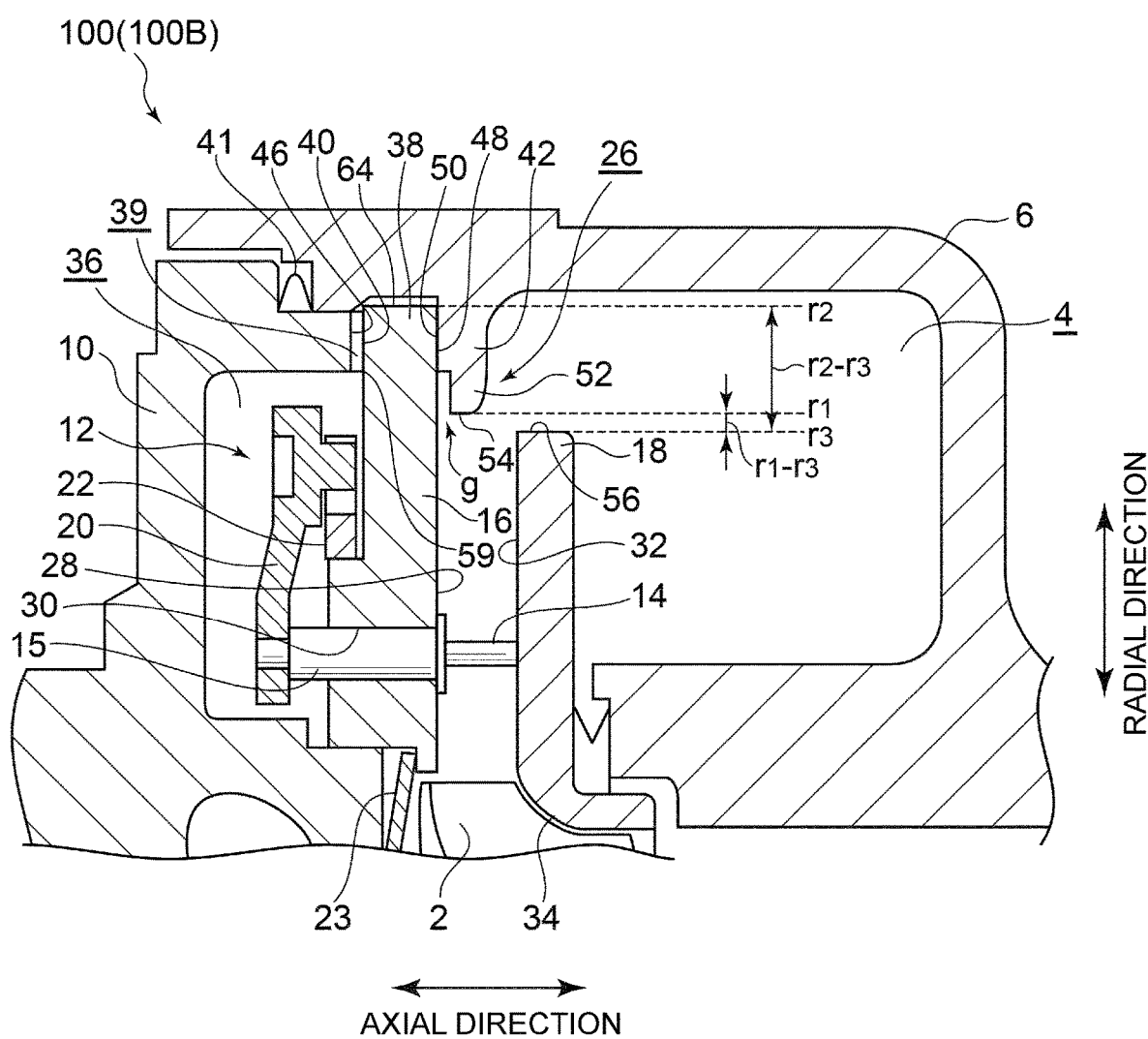
FIG. 5 is a schematic enlarged cross-sectional view of a variable geometry turbocharger 100 (100B) according to an embodiment.

FIG. 5 is a schematic enlarged cross-sectional view of a configuration example 100 (100B) of a variable geometry turbocharger 100.

In an embodiment, as shown in FIG. 5, the turbine-housing side support portion 42 is disposed so as to protrude inward in the radial direction from the bearing-housing side support portion 40 along the surface 48 of the radially outer portion 38 of the nozzle mount 16 (surface on the side of the scroll flow passage 4). That is, the radially inner end 54 of the turbine-housing side support portion 42 is positioned on the inner side of the radially inner end 59 of the bearing-housing side support portion 40 with respect to the radial direction.

Figure 13:
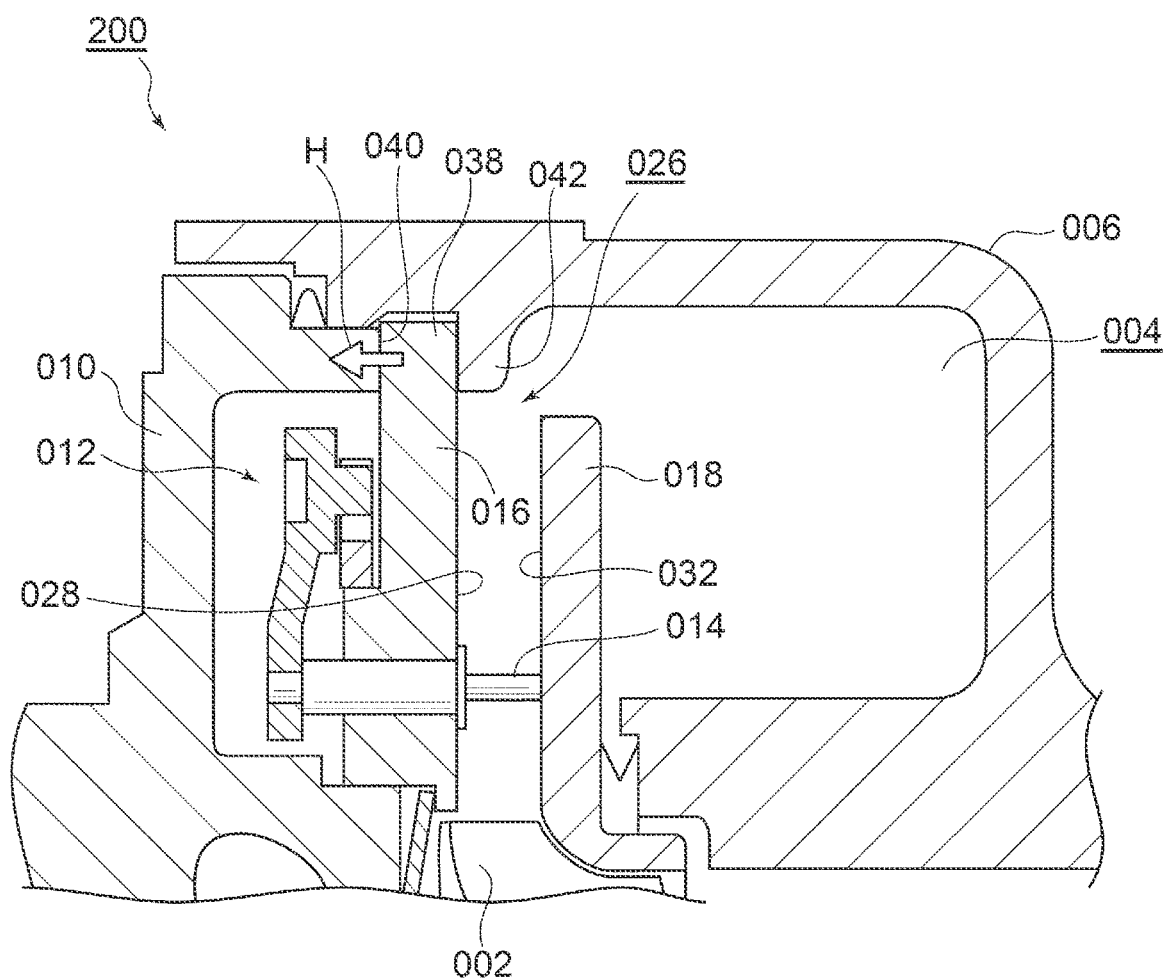
FIG. 13 is a schematic enlarged cross-sectional view of a variable geometry turbocharger 200 according to a comparative embodiment.

Typically, as shown in FIG. 13, to nip the nozzle mount 016 with a simple structure, the radially inner end 054 of the turbine-housing side support portion 42 is positioned on the same position as the radially inner end 059 of the bearing-housing side support portion 040 with respect to the radial direction.

In contrast, in the configuration shown in FIG. 5, the turbine-housing side support portion 42 is disposed so as to protrude inward in the radial direction from the bearing-housing side support portion 40 along the surface 48 of the nozzle mount 16, and thus it is possible to increase the area of the nozzle mount 16 covered with the turbine-housing side support portion 42 compared to that in a typical structure shown in FIG. 13. Thus, it is possible to reduce the area of a portion of the nozzle mount 16 exposed to a high-temperature exhaust gas flow from the scroll flow passage 4 to the exhaust gas flow passage 26 (heat transfer area). Accordingly, the heat absorption amount of the nozzle mount 16 reduces, and thus an increase in the metal temperature of the nozzle mount 16 is suppressed. Accordingly, the temperature difference between the nozzle mount 16 and the bearing housing 10 becomes small, and thus it is possible to reduce heat loss due to heat release from the radially outer portion 38 of the nozzle mount 16 to the bearing housing 10, and improve the turbine efficiency and the performance of the turbocharger 100.

Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

In an embodiment, as shown in FIG. 5, the turbine-housing side support portion 42 includes a contact portion 50 being in contact with the radially outer portion 38 of the nozzle mount 16 and a non-contact portion 52 formed on the inner side of the contact portion 50 with respect to the radial direction and facing the nozzle mount 16 via a gap g. In the depicted embodiment, the non-contact portion 52 includes a step formed from the contact portion 50 so as to provide the gap g between the non-contact portion 52 and the nozzle mount 16.

With the above configuration, the turbine-housing side support portion 42 has the non-contact portion 52 on the inner side of the contact portion 50 with respect to the radial direction, and thus it is possible to cover the radially outer portion 38 of the nozzle mount 16 with the turbine-housing side support portion 42 while suppressing an increase in the contact area between the bearing-housing side support portion 40 and the radially outer portion 38 of the nozzle mount 16. Accordingly, it is possible to reduce the area of a portion of the nozzle mount 16 exposed to a high-temperature exhaust gas flow from the scroll flow passage 4 to the exhaust gas flow passage 26 (heat transfer area), and suppress an increase in the heat input amount to the radially outer portion 38 of the nozzle mount 16 from the turbine-housing side support portion 42. Accordingly, it is possible to suppress an increase in the metal temperature of the nozzle mount 16 effectively, and reduce heat loss due to heat release from the radially outer portion 38 of the nozzle mount 16 to the bearing housing 10 effectively.

In an embodiment, as shown in FIG. 5, an expression $0 \leq (r1-r3)/(r2-r3) \leq 0.75$ is satisfied, where r1 is the distance between the radially inner end 54 of the turbine-housing side support portion 42 and the rotational axis O of the turbine rotor 2, r2 is the distance between the radially outer end 64 of the nozzle mount 16 and the rotational axis O, and r3 is the distance between the radially outer end of the nozzle mount and the rotational axis. In the depicted embodiment, an expression $0 \leq (r1-r3)/(r2-r3) \leq 0.30$ is satisfied.

With the above configuration, it is possible to suppress an increase in the metal temperature of the nozzle mount 16 effectively, and reduce heat loss due to heat release from the radially outer portion 38 of the nozzle mount 16 to the bearing housing 10 effectively, without interfering a smooth flow in the exhaust gas flow passage 26 between the nozzle mount 16 and the nozzle plate 18.

Further, the bearing housing 10 in the embodiment depicted in FIG. 5 has the same configuration as the bearing housing 10 in the embodiment depicted in FIGS. 2 and 3, and thus the same reference numerals are used to avoid repeating the same description.

Figure 6:
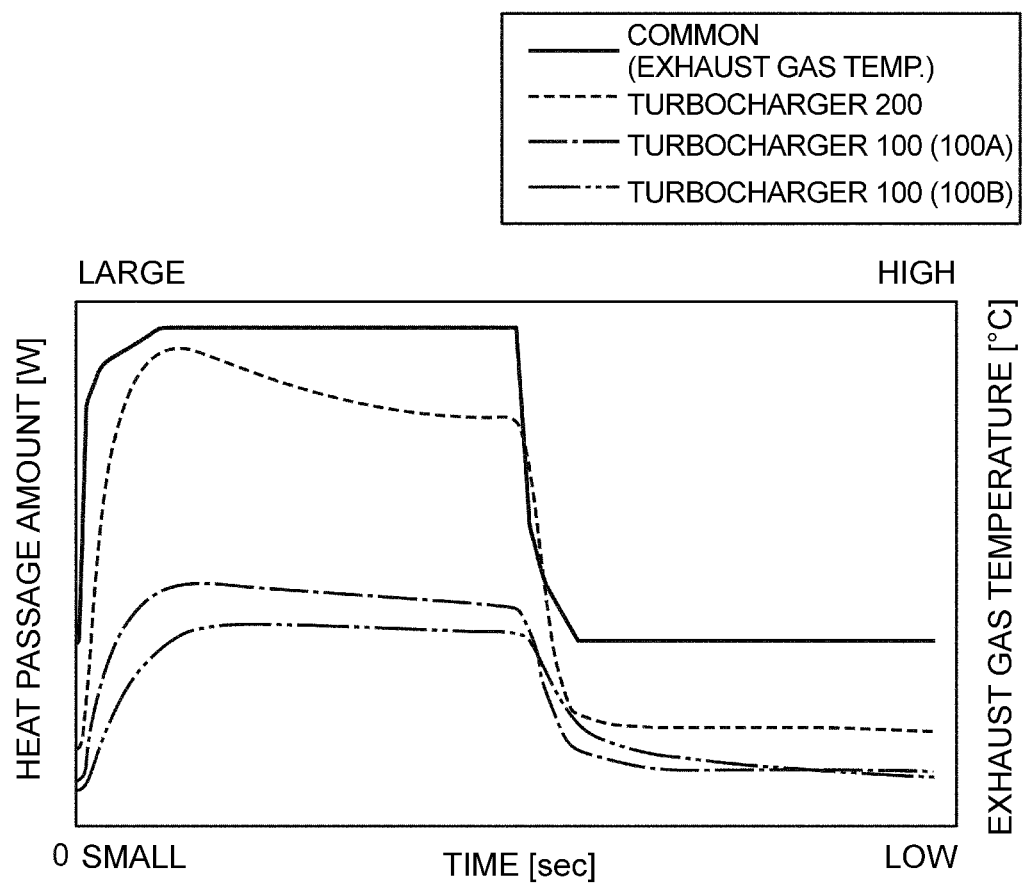
FIG. 6 is a diagram showing a relationship between a temporal change of the temperature of exhaust gas flowing through the scroll flow passage 4 (004) and a temporal change of the heat release amount (passage heat amount) from the radially outer portion 38 (038) of the nozzle mount (016) to the bearing-housing side support portion 40 (040), for each of the variable geometry turbocharger 200 according to a comparative embodiment shown in FIG. 13, the variable geometry turbocharger 100 (100A) shown in FIG. 2, and the variable geometry turbocharger 100 (100B) shown in FIG. 5.

FIG. 6 is a diagram showing a relationship between a temporal change of the temperature of exhaust gas flowing through the scroll flow passage 4 (004) and a temporal change of the heat release amount (passage heat amount) from the radially outer portion 38 (038) of the nozzle mount (016) to the bearing-housing side support portion 40 (040), for each of the variable geometry turbocharger 200 according to a comparative embodiment shown in FIG. 13, the variable geometry turbocharger 100 (100A) shown in FIG. 2, and the variable geometry turbocharger 100 (100B) shown in FIG. 5. In FIG. 6, the solid line indicates the temporal change of the exhaust gas temperature that is common in the respective embodiments, while the dotted line indicates the temporal change of the heat release amount in the variable geometry turbocharger 200 according to a comparative embodiment. Further, the single-dotted chain line indicates the temporal change of the heat release amount in the variable geometry turbocharger 100 (100A), while the double-dotted chain line indicates the temporal change of the heat release amount in the variable geometry turbocharger 100 (100B).

As shown in FIG. 6, with the variable geometry turbocharger 100 (100A) depicted in FIG. 2, it is possible to reduce the heat release amount (heat passage amount) from the radially outer portion 38 (038) of the nozzle mount (016) to the bearing-housing side support portion 40 (040), compared to the variable geometry turbocharger 200 according to the comparative embodiment. According to estimation of the present inventors, with the variable geometry turbocharger 100 (100A), it is possible to reduce heat loss by approximately 47% compared to the variable geometry turbocharger 200.

Furthermore, as shown in FIG. 6, with the variable geometry turbocharger 100 (100B) depicted in FIG. 5, it is possible to reduce the heat release amount (heat passage amount) from the radially outer portion 38 (038) of the nozzle mount (016) to the bearing-housing side support portion 40 (040), compared to the variable geometry turbocharger 200 according to the comparative embodiment. According to estimation of the present inventors, with the variable geometry turbocharger 100 (100B), it is possible to reduce heat loss by approximately 57% compared to the variable geometry turbocharger 200.

Figure 7:
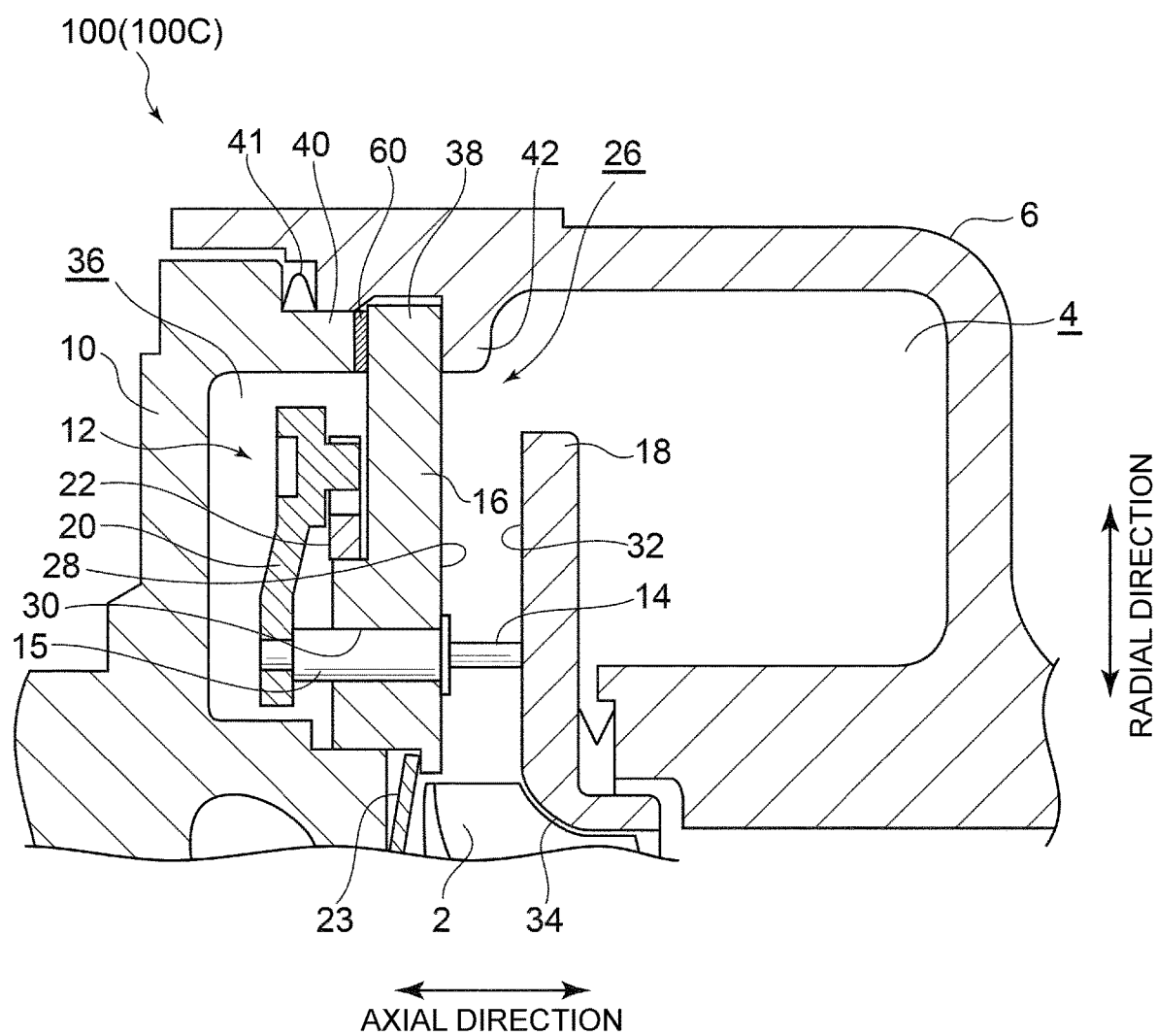
FIG. 7 is a schematic enlarged cross-sectional view of a variable geometry turbocharger 100 (100C) according to an embodiment.

FIG. 7 is a schematic enlarged cross-sectional view of a configuration example 100 (100C) of the variable geometry turbocharger 100.

In an embodiment, as shown in FIG. 7, a heat shield member 60 is disposed between the bearing-housing side support portion 40 and the nozzle mount 16.

With the above configuration, through the heat shield effect of the heat shield member 60, it is possible to reduce the heat release amount from the radially outer portion 38 of the nozzle mount 16 to the bearing housing 10. Accordingly, it is possible to reduce heat loss due to heat release from the radially outer portion 38 of the nozzle mount 16 to the bearing housing 10, and improve the turbine efficiency and the performance of the turbocharger 100. Further, it is possible to suppress a decrease in the exhaust gas temperature of the turbine outlet side. Thus, in a case where a catalyst for purifying exhaust gas is disposed on the downstream side of the turbine, it is possible to suppress performance deterioration of the catalyst due to the temperature decrease of the catalyst, and reduce content of impurity substances (e.g. NOx and SOx) in the exhaust gas.

In an embodiment, in the variable geometry turbocharger 100 (100C) depicted in FIG. 7, the thermal conductivity of the heat shield member 60 is smaller than each of the thermal conductivity of the bearing housing 10 and the thermal conductivity of the nozzle mount 16.

With the above configuration, it is possible to reduce the heat release amount from the radially outer portion 38 of the nozzle mount 16 to the bearing housing 10 effectively.

In an embodiment, in the variable geometry turbocharger 100 (100C) depicted in FIG. 7, the heat shield member 60 is formed of austenitic stainless steel or nickel-based alloy. It is preferable to use an austenitic stainless steel other than SUS 304, for example, Cr-10Ni-6Mn-1Mo for boiler tubes. As a nickel-based alloy, the following can be used suitably: Incoloy 800 (Ni-45Fe-21Cr-0.4Ti), Inconel 600 (Ni-16Cr-6Fe), Inconel X-750 (Ni-15Cr-7Fe-2.5Ti-0.6Al-0.8Nb), Hastelloy C (Ni-16Mo-15Cr-4W-5Fe), or Nimonic 90 (Ni-20Cr-17Co-2.4Ti-1.4Al). Further, the heat shield member 60 may be formed of 25Cr-20Ni anti-heat cast steel (equivalent to SUS 310) and 35Ni-15Cr anti-heat cast steel (equivalent to SUS 330). It should be noted that Incoloy, Inconel, Hastelloy, and Nimonic are trademarks.

With the above configuration, it is possible to reduce the heat release amount from the radially outer portion 38 of the nozzle mount 16 to the bearing housing 10 effectively, while ensuring the heat resistance performance of the heat shield member 60 itself.

Figure 8:
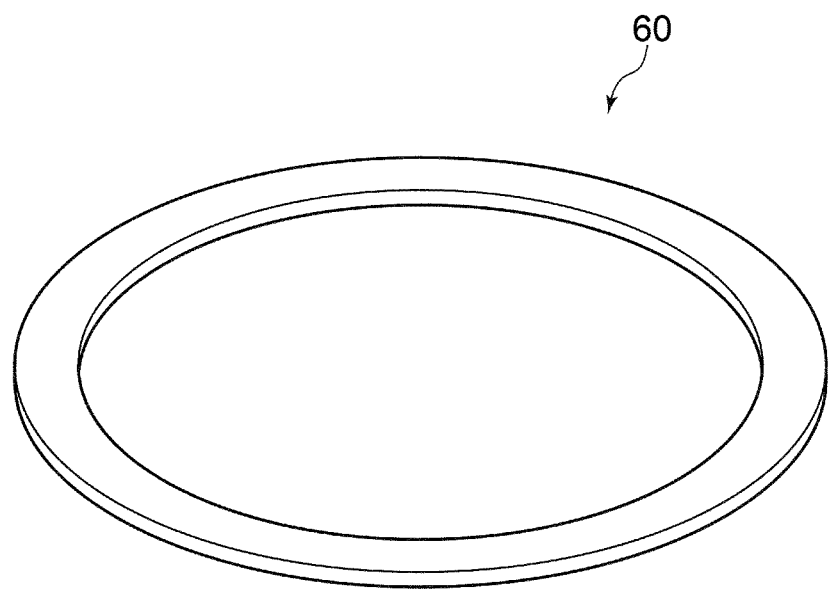
FIG. 8 is a schematic perspective view showing a configuration example of a heat shield member 60.

In an embodiment, in the variable geometry turbocharger 100 (100C) depicted in FIG. 7, the heat shield member 60 may be a ring-shaped heat shield plate (see FIG. 8) disposed so that the bearing-housing side support portion 40 and the nozzle mount 16 do not make contact with each other over the entire angular range in the circumferential direction.

With the above configuration, it is possible to reduce the heat release amount from the radially outer portion 38 of the nozzle mount 16 to the bearing housing 10 through a simple configuration.

In an embodiment, in the variable geometry turbocharger 100 (100C) depicted in FIG. 7, the heat shield member 60 may be a coating applied to the radially outer portion 38 of the nozzle mount 16 or the bearing housing 10 so that the bearing-housing side support portion 40 and the nozzle mount 16 do not make contact with each other over the entire angular range in the circumferential direction.

With the above configuration, it is possible to reduce the heat release amount from the radially outer portion 38 of the nozzle mount 16 to the bearing housing 10 through a simple configuration.

Embodiments of the present invention were described in detail above, but the present invention is not limited thereto, and various amendments and modifications may be implemented.

Figure 9:
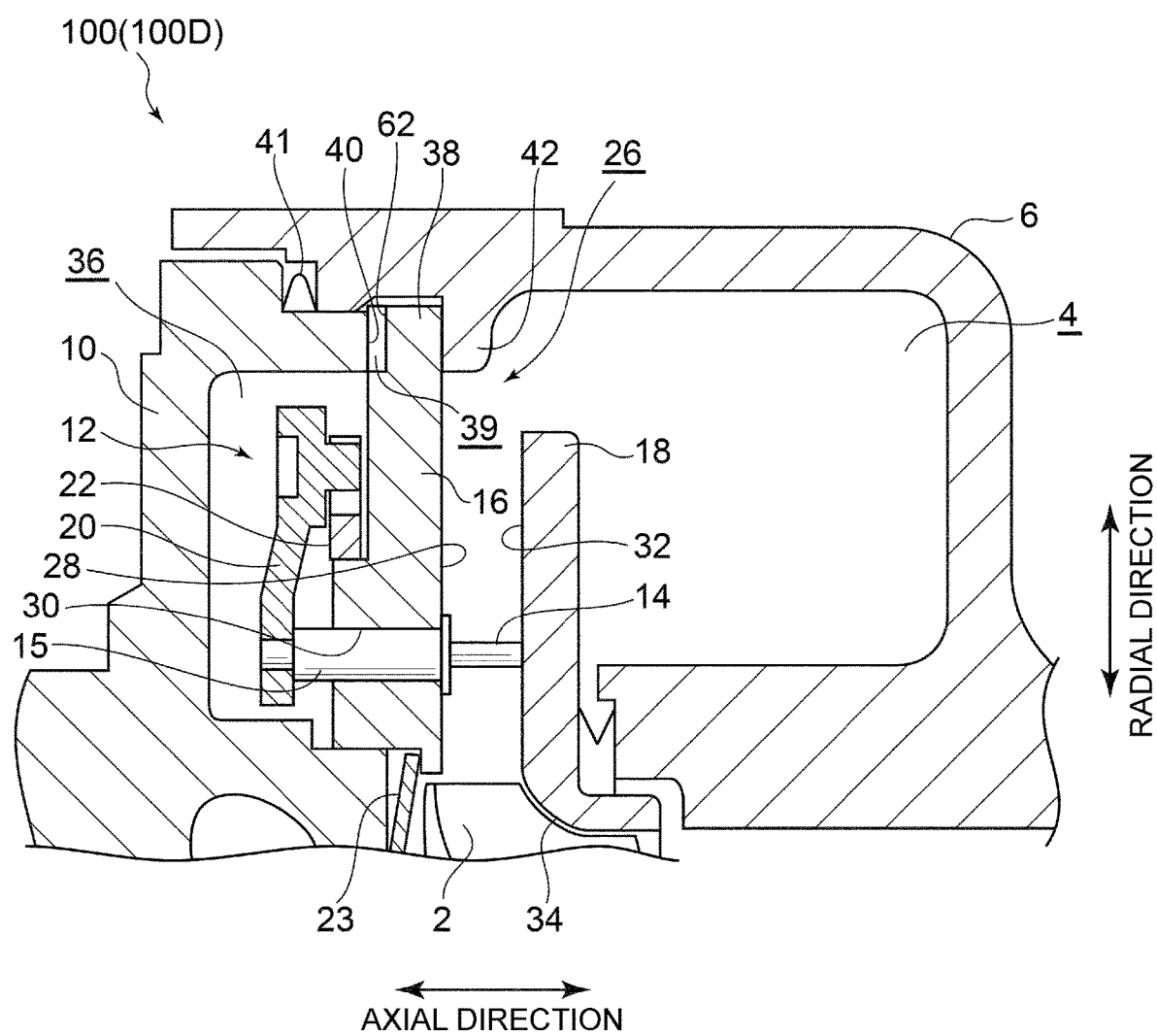
FIG. 9 is a schematic enlarged cross-sectional view of a variable geometry turbocharger 100 (100D) according to an embodiment.

For instance, in the variable geometry turbocharger 100 (100A) described with reference to FIGS. 2 to 4, the bearing-housing side support portion 40 includes a bearing-housing side recess portion 46 formed so as to be recessed opposite to the nozzle mount 16. Nevertheless, the present invention is not limited to the above embodiment, and as depicted in FIG. 9 for instance, the radially outer portion 38 of the nozzle mount 16 may include at least one nozzle-mount side recess portion 62 formed so as to be recessed opposite to the bearing housing 10 in the axial direction.

Also with the above configuration, with the nozzle-mount side recess portions 62, it is possible to reduce the contact area between the bearing-housing side support portion 40 and the radially outer portion 38 of the nozzle mount 16, and to reduce the heat release amount from the radially outer portion 38 of the nozzle mount 16 to the bearing housing 10, through the heat insulating effect of the air layer 39 between the nozzle-mount side recess portion 62 and the bearing-housing side support portion 40. Accordingly, it is possible to reduce heat loss due to heat release from the radially outer portion 38 of the nozzle mount 16 to the bearing housing 10, and improve the turbine efficiency and the performance of the turbocharger 100. Furthermore, the preferable arrangement of the nozzle-mount side recess portion 62 in the circumferential direction is similar to the preferable arrangement of the bearing-housing side recess portion 46 in the circumferential direction described above with reference to FIGS. 3 and 4.

Figure 10:
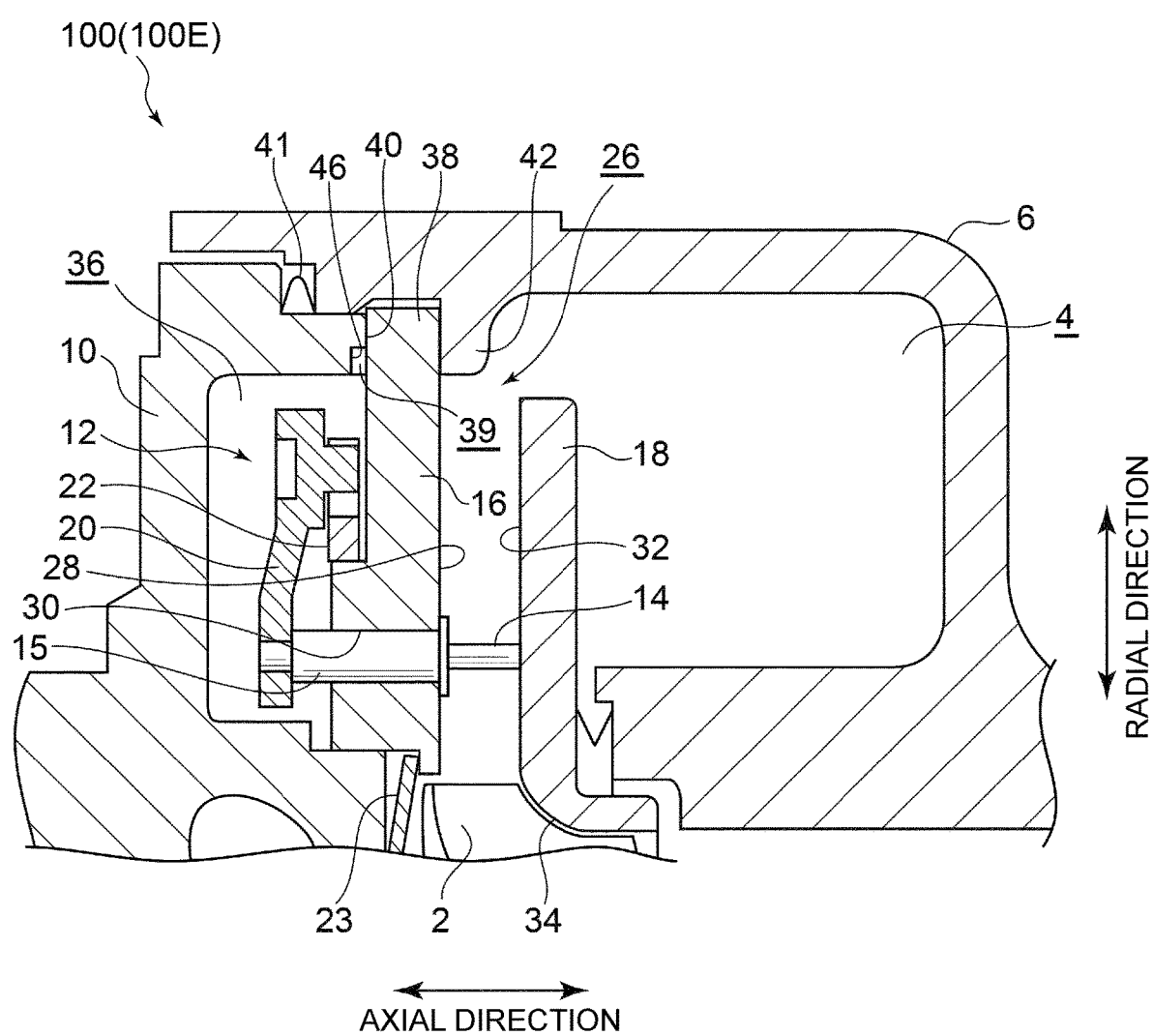
FIG. 10 is a schematic enlarged cross-sectional view of a variable geometry turbocharger 100 (100E) according to an embodiment.
Figure 11:
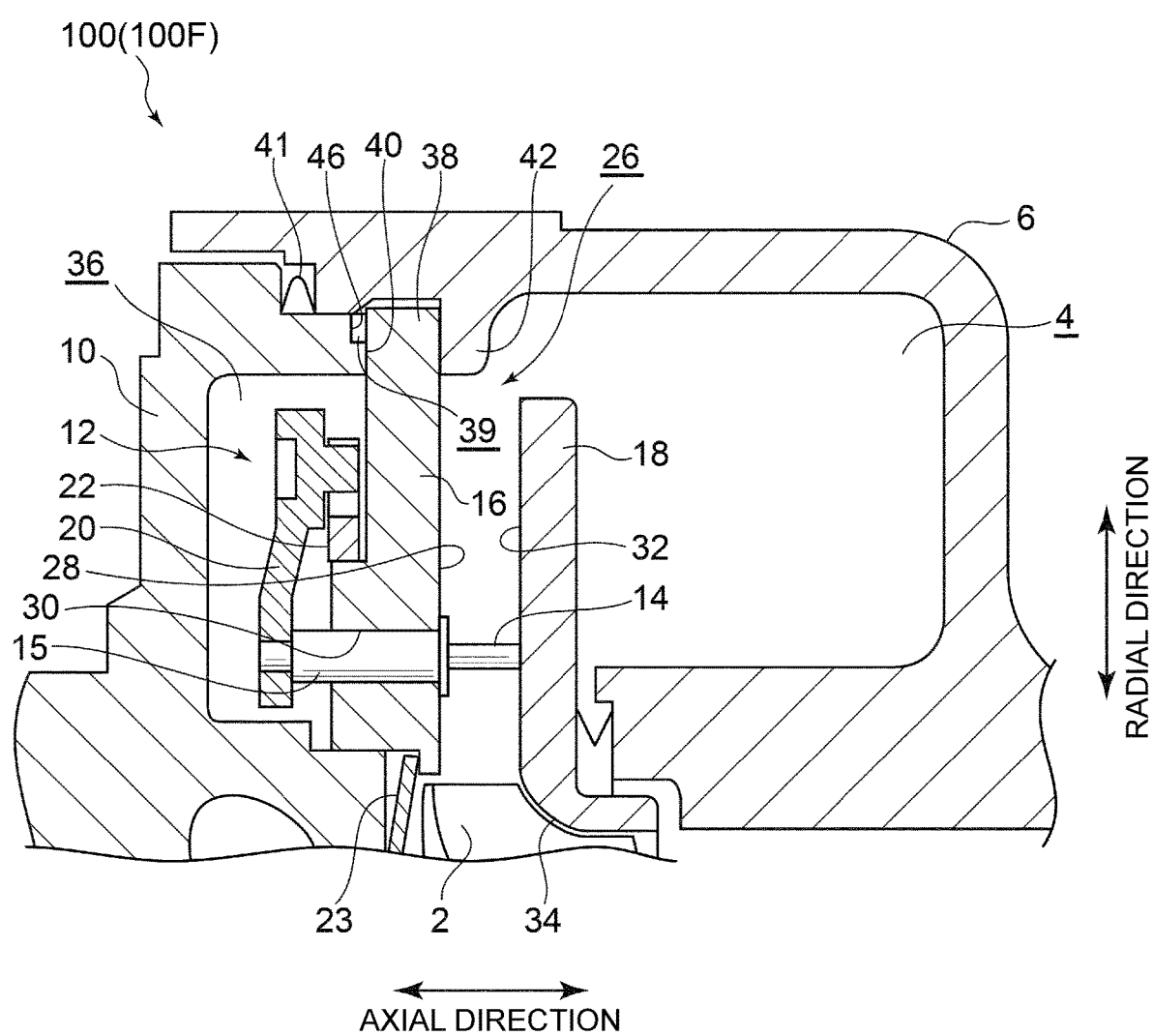
FIG. 11 is a schematic enlarged cross-sectional view of a variable geometry turbocharger 100 (100F) according to an embodiment.
Figure 12:
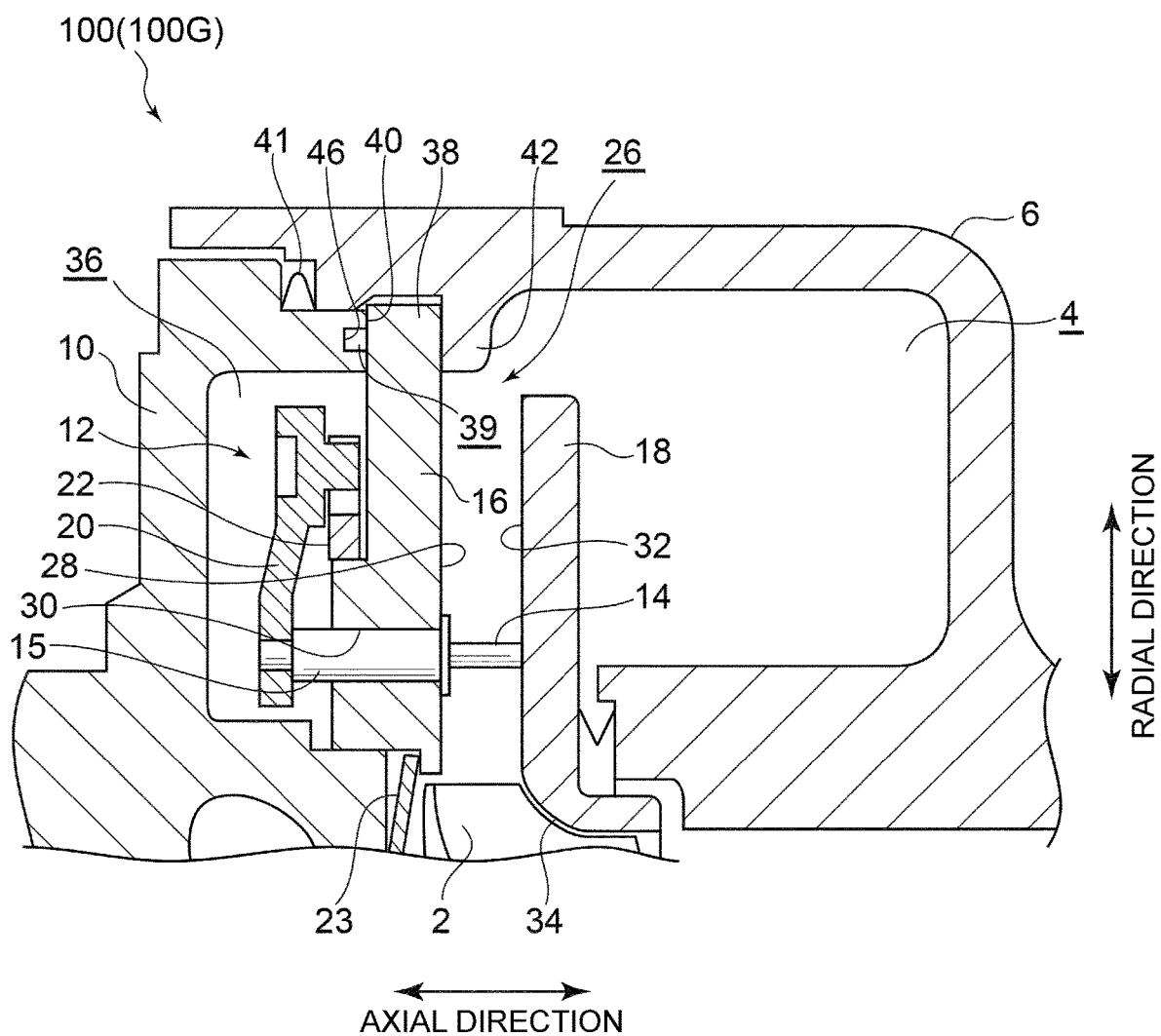
FIG. 12 is a schematic enlarged cross-sectional view of a variable geometry turbocharger 100 (100G) according to an embodiment.

Further, in the embodiment shown in FIGS. 2 and 3, the bearing-housing side recess portion 46 is formed from the radially inner side to the radially outer side of the bearing-housing side support portion 40. Nevertheless, the formation range of the bearing-housing side recess portion 46 in the radial direction is not limited this. For instance, the bearing-housing side recess portion 46 may be formed only on the radially inner side of the bearing-housing side support portion 40 as depicted in FIG. 10, only on the radially outer side of the bearing-housing side support portion 40 as depicted in FIG. 11, or only in the center of the bearing-housing side support portion 40 with respect to the radial direction. Furthermore, also in the embodiment shown in FIGS. 10 to 12, the preferable arrangement of the bearing-housing side recess portion 46 in the circumferential direction is similar to the preferable arrangement of the bearing-housing side recess portion 46 described above with reference to FIGS. 3 and 4. Further, the respective embodiments depicted in FIGS. 9 to 12 can be applied to the respective embodiments described with reference to FIGS. 1 to 8.

DESCRIPTION OF REFERENCE NUMERALS

2 Turbine rotor
4 Scroll flow passage
6 Turbine housing
8 Bearing
10 Bearing housing
12 Variable nozzle mechanism
14 Nozzle vane
15 Shaft portion
16 Nozzle mount
18 Nozzle plate
20 Lever plate
22 Drive ring
23 Back plate
24 Nozzle support
26 Exhaust gas flow passage
28 Flow passage wall
30 Support hole
32 Flow passage wall
34 Shroud wall
36 Annular space
38 Radially outer portion
39 Air layer
40 Bearing-housing side support portion
41 Seal ring
42 Turbine-housing side support portion
44 Bolt
46 Bearing-housing side recess portion
48 Surface
50 Contact portion
52 Non-contact portion
54 Radially inner end
59 Radially inner end
60 Heat shield member
62 Nozzle-mount side recess portion
64 Radially outer end
100 (100A to 199G) Variable geometry turbocharger
200 Variable geometry turbocharger
Ar Angular range
H Arrow
Rotational axis
Pv Center position
g Gap

The invention claimed is:
1. A variable geometry turbocharger, comprising:
a turbine rotor;
a turbine housing which accommodates the turbine rotor and which forms a scroll flow passage on a radially outer side of the turbine rotor;
a bearing housing accommodating a bearing which rotatably supports the turbine rotor, the bearing housing being coupled to the turbine housing; and
a variable nozzle mechanism for adjusting a flow of exhaust gas to the turbine rotor from the scroll flow passage,
wherein the variable nozzle mechanism includes:
a nozzle vane disposed in an exhaust gas flow passage for guiding the exhaust gas from the scroll flow passage to the turbine rotor;
a nozzle mount having an annular shape and supporting the nozzle vane rotatably, the nozzle mount forming a flow passage wall on a bearing-housing side of the exhaust gas flow passage; and
a nozzle plate having an annular shape and being disposed so as to face the nozzle mount, the nozzle plate forming a flow passage wall, of the exhaust gas flow passage,
a plurality of bolts disposed at intervals in a circumferential direction of the turbine rotor and configured to fasten the turbine housing and the bearing housing in the axial direction,
wherein the bearing housing includes a bearing-housing side support portion configured to support a radially outer portion of the nozzle mount from a side opposite to the scroll flow passage in an axial direction of the turbine rotor,
wherein the bearing-housing side support portion includes at least one bearing-housing side recess portion formed so as to be recessed toward a side opposite to the nozzle mount in the axial direction,
wherein the at least one bearing-housing side recess portion includes a plurality of bearing-housing side recess portions disposed at intervals in a circumferential direction of the turbine rotor, and
wherein the bearing-housing side recess portion is formed in an angular range which does not overlap with a center position of a bolt adjacent to the bearing-housing side recess portion, of the plurality of bolts, in the circumferential direction.
2. The variable geometry turbocharger according to claim 1,
wherein the bearing-housing side recess portion is formed to be 5 degrees or more apart from the center position of the bolt adjacent to the bearing-housing side recess portion, of the plurality of bolts, in the circumferential direction.
3. The variable geometry turbocharger according to claim 1,
wherein the turbine housing includes a turbine-housing side support portion configured to support the radially outer portion of the nozzle mount from a side opposite to the bearing-housing side support portion in the axial direction,
wherein the nozzle mount is nipped by the turbine-housing side support portion and the bearing-housing side support portion, and
wherein the turbine-housing side support portion is disposed so as to protrude toward an inner side of the bearing-housing side support portion in a radial direction of the turbine rotor, along a surface of the nozzle mount.

4. The variable geometry turbocharger according to claim 3,
wherein the turbine-housing side support portion includes a contact portion to be in contact with the radially outer portion of the nozzle mount, and a non-contact portion formed on an inner side of the contact portion in the radial direction, the non-contact portion facing the nozzle mount via a gap.

5. The variable geometry turbocharger according to claim 3,
wherein an expression $0 \leq (r1-r3)/(r2-r3) \leq 0.75$ is satisfied, where r1 is a distance between a radially inner end of the turbine-housing side support portion and a rotational axis of the turbine rotor, r2 is a distance between a radially outer end of the nozzle mount and the rotational axis, and r3 is a distance between a radially outer end of the nozzle plate and the rotational axis.

6. The variable geometry turbocharger according to claim 5,
wherein an expression $0 \leq (r1-r3)/(r2-r3) \leq 0.30$ is satisfied.

7. The variable geometry turbocharger according to claim 1, further comprising:
a heat shield member disposed between the bearing-housing side support portion and the nozzle mount.

8. The variable geometry turbocharger according to claim 7,
wherein the heat shield member has a lower thermal conductivity than each of a thermal conductivity of the bearing housing and a thermal conductivity of the nozzle mount.

9. The variable geometry turbocharger according to claim 7,
wherein the heat shield member is formed of austenitic stainless steel or nickel-based alloy.

10. The variable geometry turbocharger according to claim 7,
wherein the heat shield member comprises a ring-shaped heat-shield plate disposed so that the bearing-housing side support portion and the nozzle mount do not make contact with each other over an entire angular range in a circumferential direction of the turbine rotor.

11. The variable geometry turbocharger according to claim 7,
wherein the heat shield member comprises a coating applied to the radially outer portion of the bearing-housing side support portion or the nozzle mount.

* * * * *